UNITED STATES PATENT OFFICE.

ALFRED M. MEINCKE, OF BROOKLYN, NEW YORK.

DYEING COMPOUND.

SPECIFICATION forming part of Letters Patent No. 276,061, dated April 17, 1883.

Application filed February 17, 1883. (Specimens.)

*To all whom it may concern:*

Be it known that I, ALFRED M. MEINCKE, a citizen of the United States, residing in the city of Brooklyn, county of Kings, and State of New York, have invented a new and useful composition of matter to be used as a paint or dye, known as "Garnet Powder," of which the following is a specification.

My composition consists of the following ingredients, combined in the proportions stated, viz: cornmeal, sifted fine, one pound; highly-concentrated cudbear, two pounds; indigotine, two ounces; acid magenta, seven ounces; wool-orange, five ounces; imported cudbear, five pounds.

The process by which the composition is made is as follows: I take fine sifted cornmeal as a body and distributer, and mix with this the indigotine and acid magenta, and manipulate the whole in a mixer for about fifteen minutes, until the mass is thoroughly combined. The resulting combination is then placed in a grinder or mill and reduced to a fine powder, which powder is of a greenish-gray shade. I place this powder again in a mixer with wool-orange, and the whole is thoroughly combined. To the resulting composition I then add the imported cudbear, and the whole is then thoroughly commingled in the mixer, which operation usually takes about five minutes. Finally, I add to the compound the highly-concentrated cudbear, pass the whole through a mixer, and then reduce the compound to a powder, passing it through a mill or grinder. We have as a result the Garnet Powder.

I am aware that a composition consisting of indigotine, acid magenta, wool-orange, and imported cudbear has been used as a dye for some time past. I am not aware, however, that cornmeal has ever been used, or highly-concentrated cudbear; nor am I aware that all of the ingredients of my composition, in the proportions stated, have been used together.

The addition of the cornmeal affects the preparation as follows: It provides a body for the composition, which acts as an even distributer of the dye and as an absorbent of the anilines. I know of no other substitute for cornmeal. Salt or alum might be used; but the resulting compound would be vastly inferior as a dye, because the salt or alum would not absorb the dye as evenly, and when a dye is made of salt or alum it does not dye the goods evenly. If the cornmeal is not used, the result is that when the anilines go through the mill or grinder they all liquidate and consolidate together in different proportions, so that when the resulting dye is placed in water the shade is different and uncertain, and the aniline will at once fly to the wool, leaving the cudbear to follow, thus destroying the effect of the dye and rendering redyeing necessary. Wool-orange is the sodium salt of diazo-naphthol-sulphanilic acid. Highly-concentrated cudbear, being orchil containing a large percentage of the dye-stuff, and prepared so as to have a reddish color and give a reddish shade on wool, is a different article from imported cudbear, and the result of the introduction of this element is, that the strength of the dye is increased without any increase of expense. Four parts of a dye used with highly-concentrated cudbear is equivalent in strength to nine parts of a dye made in the same manner with the imported cudbear simply. The addition, therefore, of the cornmeal and of the highly-concentrated cudbear is that a more perfect mixture is produced, and the resulting dye-stuff more economically and conveniently manufactured.

What I claim, and desire to secure by Letters Patent of the United States, is—

The herein-described composition of matter to be used as a dye, consisting of cornmeal, highly-concentrated cudbear, indigotine, acid magenta, wool-orange, and imported cudbear, in the proportions specified.

Dated February 6, 1883.

ALFRED M. MEINCKE.

Witnesses:
JAMES B. DILL,
LOUIS A. CHANDLER.